United States Patent [19]

Boyle

[11] 4,153,009
[45] May 8, 1979

[54] ELECTRIC SHOCK TRAINING DEVICE FOR ANIMALS

[76] Inventor: William Boyle, 428 Laurel, Romeoville, Ill. 60441

[21] Appl. No.: 822,735

[22] Filed: Aug. 8, 1977

[51] Int. Cl.² ............................................. A01K 15/00
[52] U.S. Cl. .................................................... 119/29
[58] Field of Search ................. 119/29; 128/82.1, 155, 128/24.5; 231/2 E; 361/232

[56] References Cited

U.S. PATENT DOCUMENTS

| | | | |
|---|---|---|---|
| 1,545,413 | 7/1925 | Elmvall | 128/24.5 |
| 1,915,721 | 6/1933 | Diaz | 128/24.5 |
| 2,155,331 | 4/1939 | Sadloski | 361/232 X |
| 2,981,465 | 4/1961 | Bartel | 231/2 E |

*Primary Examiner*—Hugh R. Chamblee
*Attorney, Agent, or Firm*—Ernest S. Kettelson

[57] ABSTRACT

An electric shock protective device for animals to protect, for example, a bandage affixed to one of the animal's legs. The device is positioned on or around the bandage, and if the animal attempts to bite or chew on the bandage, or the sore or wound on its leg, its mouth and tongue will come into contact with the protective device causing it to produce a mild electric shock. The device includes a flexible mounting band dimensioned to surround the leg of an animal for which it is intended, a plurality of electrical conductors such as thin copper bus bars mounted thereon in substantially parallel relationship, an electrical power source such as one or more electrically connected batteries having a negative and a positive terminal, a first one of said electrical conductors connected to said negative terminal and a second one of said electrical conductors connected to said positive terminal. The electrical conductors face outwardly when the protective device is wrapped around the bandaged leg, whereby the animal's tongue or mouth contacts both the said first and second conductors which completes an electrical circuit and produces an electrical shock to the portion of the tongue or mouth in contact with the conductors. More than two conductors may be mounted in parallel spaced apart relationship on the flexible mounting band, in which case they are connected so each adjacent one is of opposite polarity.

10 Claims, 4 Drawing Figures

ELECTRIC SHOCK TRAINING DEVICE FOR ANIMALS

BACKGROUND OF THE INVENTION

This invention relates to the field of an electric shock device to prevent an animal from doing something it ought not do.

In the broader field of training apparatus in general, a number of devices which produce an electric shock are known. The following patents disclose various types of apparatus for such purpose.

U.S. Pat. No. 3,874,339 discloses a training collar having an electrical device to produce a shock when the dog, or other animal, strains at its leash. The pull on the leash closes a switch to energize the circuit.

U.S. Pat. No. 3,827,403 discloses an electric shock device attached to an animal's tail which produces a shock depending on the angular position of the tail, such as when raised. The electric shock circuit is energized in this device by means of a magnetic field produced by AC current flowing in conductors which surround a defined area, and a battery powered circuit carried on the animal's tail which includes a tail direction sensor, electronic switches, and an amplifier responsive to the aforesaid magnetic field. Upon sensing a particular change in the direction of the animal's tail, the circuit applies an input signal to the amplifier which if within the area of the magnetic field produces an output sufficient to drive a shocking mechanism.

U.S. Pat. No. 3,753,421 discloses a device having a high voltage, low powered, receiving circuit attached to a dog's collar, which picks up a signal from a boundary wire emitting electrical signals, so when the dog gets near the wire it receives a shock.

U.S. Pat. No. 3,687,112 discloses an electric shock apparatus mounted on a neck strap to deliver an electrical shock to horses when their neck expands or swells as they engage in the undesirable habit of cribbing or windsucking. A ribbon switch closes when the horse's neck is swelled, to complete the electric circuit which produces the shock.

U.S. Pat. No. 2,996,043 discloses a training collar for animals, such as hunting dogs, having batteries mounted on one side of the collar and a coil assembly on the other side to deliver a shock to the animal after a time delay. In this device, the energizing switch is closed manually, and a timing device is set to deliver the electric shock after a selected time lapse has expired.

U.S. Pat. No. 2,741,224 discloses a device which includes a microphone to pick up the sound of a dog when barking, causing current to flow through a relay connected to a battery. The battery then delivers current to an electrode which provides an electrical shock in response to the bark. The microphones described are throat microphones.

U.S. Pat. No. 2,579,178 discloses a shocking apparatus powered by the electrical system of an automobile with conductors attached to a dead animal which the trainer desires to teach a dog not to chase, such as a rabbit.

U.S. Pat. No. 487,461 discloses another neck strap device which delivers an electric shock to a horse when it indulges in the bad habit of cribbing. When the horse's neck expands, a pressure plate type of switch mounted in the neck strap makes contact and closes an electrical circuit which delivers a shock to the horse.

Prior art devices of the type disclosed in the foregoing patents require the use of a switch mechanism to close the circuit which provides the electrical shock, or magnetic or radio frequency emitting and pick-up devices to accomplish the objective, or other independent means to complete the electrical circuit which produces an electrical shock. Such switches or other mechanisms are subject to damage and failure which renders the device inoperative. The present invention overcomes such problem by eliminating the need for a switch or other component to close the circuit which produces a shock to the animal. The device in accordance with this invention includes parallel bared conductors connected to respective positive and negative terminals of a low voltage source in open circuit arrangement. The circuit is closed by the animal on which it is mounted touching both conductors with its tongue or lips, thereby causing current to flow momentarily and delivering a mild electrical shock. The shock is localized and confined to that area of the animal's body between its point of contact with the negative conductor and its point of contact with the positive conductor. Current flow ceases immediately when the animal's tongue or other body portion is withdrawn out of contact with the conductors.

SUMMARY OF THE INVENTION

It is an object of the invention to provide a simplified electric shock training device for animals.

It is an object of the invention to provide an electric shock training device for animals comprising a portable low power source of electrical energy and conductors of opposite polarity leading therefrom in open circuit condition, at least a portion of each of said conductors being bared, said bared portions being spaced apart a pre-selected relatively short distance to enable a part of an animal's body to contact both of said bared portions simultaneously and thus close an electrical circuit energized by said power source.

It is an object of the invention to provide a durable electric shock training device which is portable, mounted and carried on the body of an animal, having a minimum of component parts subject to damage.

DESCRIPTION OF PREFERRED EMBODIMENT

Figure 1:
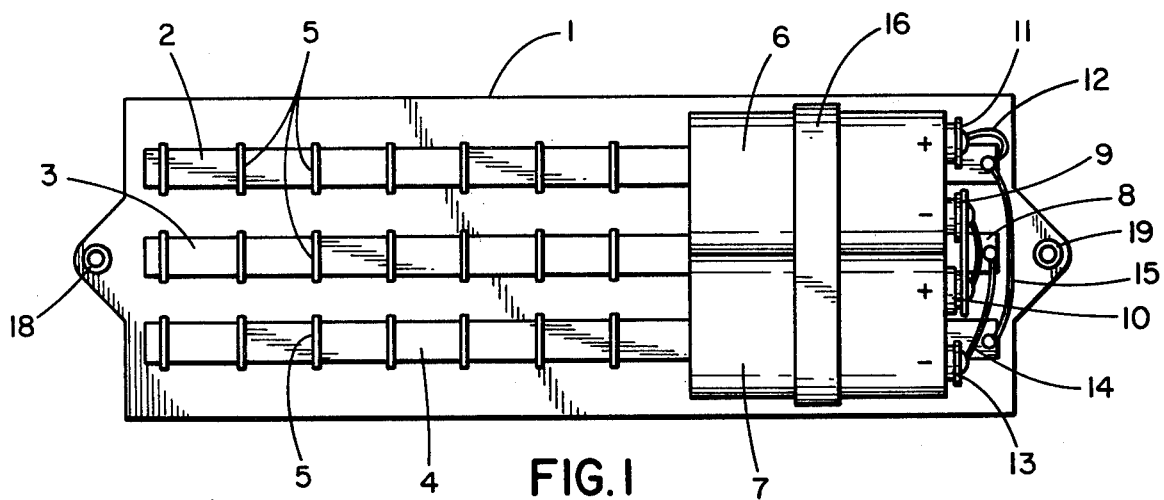
FIG. 1 is a plan view of an electric shock training device in accordance with this invention, showing the battery power source and terminal connections exposed.
Figure 3:
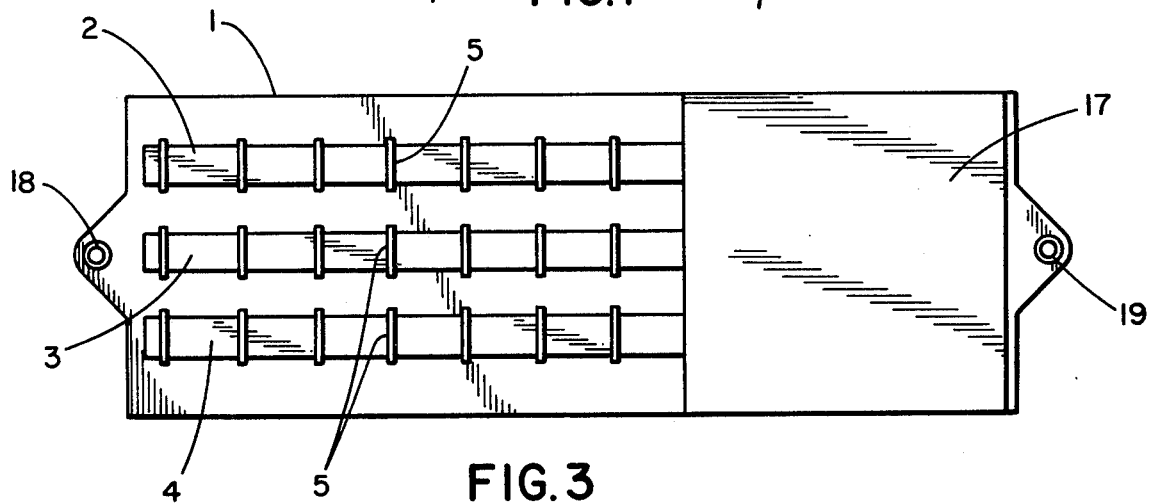
FIG. 3 is a plan view of the device of FIG. 1, shown with a protective enclosure over the batteries and terminal connections.

The electric shock training device in accordance with this invention includes a flexible mounting band 1 of electrically insulating material, wide enough to carry at least two electrical conductors such as the thin copper bus bars 2, 3 and 4 shown in the drawing, and long enough to be wrapped around the leg or other body portion of an animal on which it is going to be used.

The bus bars 2, 3 and 4 are mounted on the flexible mounting band 1 in closely spaced apart substantially parallel relationship. Bus bars 2 and 4 which are adjacent the opposite longitudinal edges of the mounting band 1 are positive as shown in FIG. 1, and the centrally positioned bus bar 3 is negative. The bus bars are secured to the mounting band 1 by any convenient means, such as the brads 5.

The electrical power source for this invention preferably consists of low voltage batteries, such as one or more nine volt transistor batteries. The batteries shown and described herein are two nine volt transistor batteries 6 and 7, connected in series by a conductor 8 which is connected to the negative terminal 9 of battery 6 and to the positive terminal 10 of battery 7.

As shown in the drawing, bus bar 2 is connected to the positive terminal 11 of battery 6 by means of conductor 12. Bus bar 3 is connected to the negative terminal 13 of battery 7 by means of conductor 14. Bus bar 4 is connected to the bus bar 2 by means of conductor 15, thereby making both bus bar 2 and bus bar 4 positive while bus bar 3 is negative. The connections may be made by use of screw terminals or by soldering.

The batteries 6 and 7 are secured to the flexible mounting band 1 by means of a strap 16. The batteries and terminal connections are enclosed by any suitable protective enclosure, such as the case 17 which may be of hard rubber or plastic. A satisfactory covering may also be electrical tape wound tightly around the batteries and terminal end portion.

Figures 2, 4:
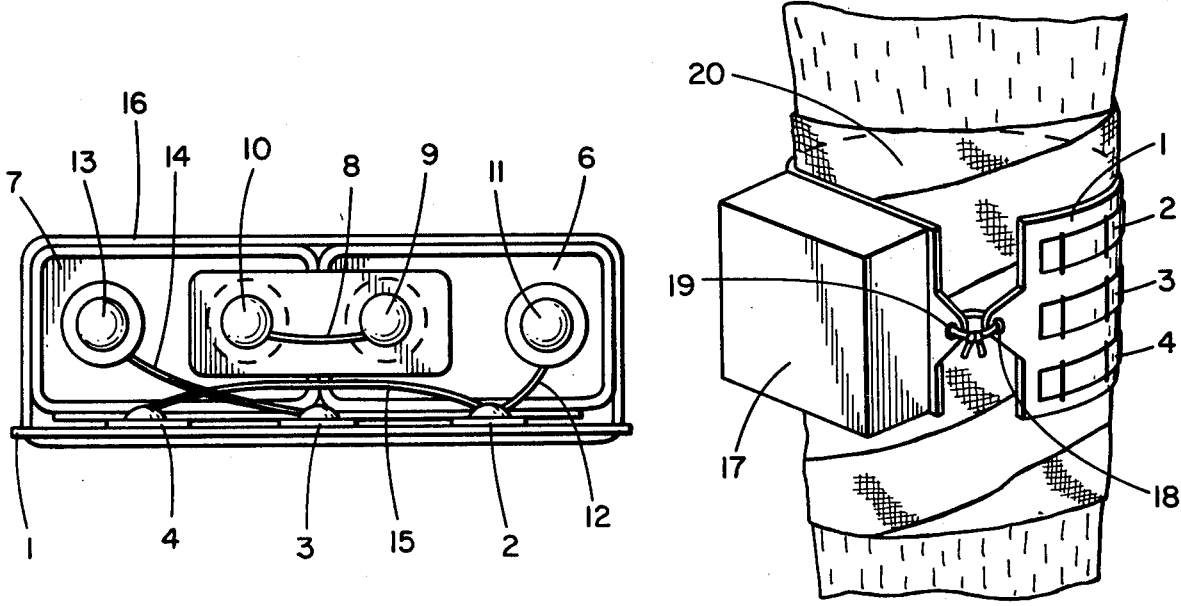
FIG. 2 is an end view of the device shown in FIG. 1.
FIG. 4 is a fragmentary view of an animal's leg showing the device of FIG. 3 mounted thereon over a bandage which the device is intended to protect.

The mounting band 1 includes securing apertures 18 and 19 at each opposite end, through which a tie band or cord may be inserted to draw each opposite end together when the device is wrapped around the bandage 20 as shown in FIG. 4 on an animal's leg.

A primary use for the device is to prevent an animal from chewing or gnawing at a bandage, or sore, on its leg. The device is mounted over such bandage as shown in FIG. 4 by wrapping the mounting band 1 around the bandaged portion of the leg and securing it in place by means of a tie band or cord, with the bus bars 2, 3 and 4 facing outwardly and being exposed for contact. When the animal attempts to gnaw at the bandage, its lips and/or tongue come into contact with bus bars 2 and 3, or 3 and 4, thus making a connection between a positive and negative conductor causing a current to flow. The current is sufficient to create a mild electrical shock, thus causing the animal to quickly withdraw its mouth and tongue. After a few such experiences, the animal learns to leave the bandage alone.

The electrical shock produced by this device is localized and limited to that portion of the animal's body which lies between the points of contact with the positive and negative terminals, and those portions in the vicinity of such contacts and area therebetween.

By way of illustration and not limitation, it has been found that batteries having an output of up to sixty-nine volts do not produce a harmful shock. At the other end of the scale, it has been found that a battery source having an output of as little as nine volts produces an effective shock when used in accordance with this invention. A convenient power source is two nine volt transistor batteries connected in series.

I claim:

1. An electrical shock training device for animals, including an electrical power source having a first terminal of one polarity and a second terminal of opposite polarity at any given instant in time, a first conductor connected directly to said first terminal, a second conductor connected directly to said second terminal, an elongated, flexible non-conductive supporter, said power source and terminals being mounted on said elongated flexible non-conductive supporter, said first conductor including a first bared portion, said second conductor including a second bared portion, said first and second conductors being normally non-conducting, said first and second bared portions being elongated and spaced apart a pre-selected distance to enable contact with both of said bared portions simultaneously by an electrically conductive portion of an animal on which it is used, said conductors becoming electrically conducting when both of said first and second bared portions of said normally non-conducting conductors are contacted simultaneously by said electrically conductive portion of said animal, said elongated, flexible, non-conductive supporter including fastening means to enable affixing said device to a portion of an animal for use thereon.

2. An electric shock training device as set forth in claim 1, wherein said first and second conductors are flat, thin flexible bus bars.

3. An electrical shock training device for animals as set forth in claim 1, wherein said first and second conductors are mounted on said flexible supporter in substantially parallel relationship, said first and second bared portions comprising substantially that part of the entire length of said first and second conductors respectively which extends outwardly from said power source.

4. An electric shock training device for animals as set forth in claim 1, wherein said power source has an output voltage of no less than nine volts.

5. An electric shock training device for animals as set forth in claim 1, wherein said power source has an output voltage within a range of between nine volts and sixty-nine volts.

6. An electric shock training device for animals as set forth in claim 1, including a third conductor, said third conductor being normally non-conducting, said third conductor including a third bared portion, said third bared portion being elongated and spaced from said second bared portion substantially the same pre-selected distance as said first and second bared portions are spaced apart, said third conductor being electrically connected to said first terminal of said electrical power source and having the same polarity as said first conductor, said third conductor becoming electrically conducting when both of said second and third bared portions of said normally non-conducting second and third conductors are contacted simultaneously by said electrically conductive portion of said animal, said first, second and third conductors being electrically connected so each adjacent one is of opposite polarity, said first, second and third conductors and their respective bared portions being mounted in spaced apart substantially parallel relationship on said non-conductive supporter.

7. An electric shock training device for animals as set forth in claim 6, wherein said electric power source includes a battery, said first terminal thereof is positive and said second terminal thereof is negative, said first and third conductors are electrically connected to one of said terminals, said second conductor is electrically connected to the other of said terminals, the electric shock provided when the bared portion of said second conductor and that of one of said first and third conductors is contacted simultaneously by an electrically conductive portion of said animal being localized and limited to that portion of the animal's body which lies between the points of contact with said bared portions of said conductors connected respectively to said positive and negative terminals of said battery, and to those portions of said animal's body in the vicinity of such contacts and the area therebetween.

8. An electric shock trainig device for animals as set forth in claim 6, wherein said electric power source includes a battery, said first terminal thereof is positive and said second terminal thereof is negative, said first and third conductors are electrically connected to said negative terminal, said second conductor is electrically connected to said positive terminal.

9. An electric shock training device for animals as set forth in claim 6, wherein said electric power source includes a plurality of batteries connected in series, said first terminal of one polarity being on a first of said plurality of batteries, said second terminal of opposite polarity being on a second of said plurality of batteries, said first and third conductors are electrically connected to said first terminal, said second conductor is electrically connected to said second terminal.

10. An electric shock training device for animals as set forth in claim 6, wherein said first, second and third conductors are flat, thin flexible bus bars and are mounted on said flexible supporter in substantially parallel relationship, said first, second and third bared portions comprising substantially that part of the entire length of said first, second and third conductors respectively which extends outwardly from said power source.

* * * * *